United States Patent [19]

Kolstee

[11] Patent Number: 5,018,937
[45] Date of Patent: May 28, 1991

[54] SHEARCLIP-HANDLING TOOL

[75] Inventor: Hans M. Kolstee, Glen Cove, N.Y.

[73] Assignee: Grumman Aerospace Corporation, Bethpage, N.Y.

[21] Appl. No.: 528,904

[22] Filed: May 29, 1990

Related U.S. Application Data

[63] Continuation of Ser. No. 253,648, Oct. 5, 1988, abandoned.

[51] Int. Cl.$^5$ .............................................. B25J 15/06
[52] U.S. Cl. ..................................... 414/783; 414/737; 414/740; 901/39; 901/40; 294/2; 294/64.1; 294/104
[58] Field of Search ............... 414/225, 226, 606, 621, 414/627, 729, 737, 739, 740, 741, 751, 752, 753, 744.8; 901/31, 39, 40; 294/2, 64.1, 104

[56] References Cited

U.S. PATENT DOCUMENTS

| | | | |
|---|---|---|---|
| 2,783,078 | 2/1957 | Billner | 414/606 X |
| 4,437,232 | 3/1984 | Araki et al. | 414/627 X |
| 4,456,293 | 6/1984 | Panissidi | 414/739 X |
| 4,473,247 | 9/1984 | Itemadani et al. | 294/2 |
| 4,494,902 | 1/1985 | Kuppens et al. | 414/226 X |
| 4,610,473 | 9/1986 | Hawkswell | 294/2 X |
| 4,723,353 | 2/1988 | Monforte | 414/737 X |
| 4,806,070 | 2/1989 | Poux et al. | 901/40 X |
| 4,828,304 | 5/1989 | No et al. | 901/40 X |
| 4,840,416 | 6/1989 | Jacobsen | 901/40 X |
| 4,858,974 | 8/1989 | Stannek | 294/2 |
| 4,902,192 | 2/1990 | Ziegler | 414/737 X |

FOREIGN PATENT DOCUMENTS

| | | | |
|---|---|---|---|
| 1191759 | 4/1965 | Fed. Rep. of Germany | 901/39 |
| 1363431 | 5/1964 | France | 901/39 |
| 2304451 | 10/1976 | France | 414/739 |
| 0152087 | 11/1981 | German Democratic Rep. | 294/104 |
| 0254568 | 3/1988 | German Democratic Rep. | 294/104 |
| 0033675 | 3/1979 | Japan | 414/606 |
| 0119487 | 6/1986 | Japan | 901/39 |
| 0632564 | 11/1978 | U.S.S.R. | 901/40 |
| 1237423 | 6/1986 | U.S.S.R. | 901/40 |
| 1296406 | 3/1987 | U.S.S.R. | 901/39 |
| 1399115 | 3/1988 | U.S.S.R. | 294/2 |
| 1445951 | 12/1988 | U.S.S.R. | 901/39 |
| 2124180 | 2/1984 | United Kingdom | 901/31 |

Primary Examiner—Robert J. Spar
Assistant Examiner—John Vanden Bosche
Attorney, Agent, or Firm—Pollock, VandeSande & Priddy

[57] ABSTRACT

A robotic tool is provided for temporarily positioning shearclips against structural members. The device incorporates a movable jaw linkage which provides sufficient clamping force for withdrawing a shearclip from an adhesively retained position in a storage tray. After a shearclip is removed from the storage tray, the movable jaw is displaced to a non-clamping position and vacuum retention of the shearclip is relied upon. The present robotic device achieves two time-saving objectives in the assembly of aircraft. It permits rapid preparation of shearclips as well as rapid mechanical-handling deployment of a prepared shearclip for utilization with a structural member.

6 Claims, 2 Drawing Sheets

SHEARCLIP-HANDLING TOOL

This application is a continuation, of application Ser. No. 07/253,648, filed Oct. 5, 1988, now abandoned.

FIELD OF THE INVENTION

The present invention relates to robotic devices, and more particularly to a mechanical-vacuum handling mechanism for loading brackets into a robotic tool.

BRIEF DESCRIPTION OF THE PRIOR ART

In the construction of aircraft bodies, a large number of brackets, referred to as shearclips, is employed to connect structural members to which an aircraft skin is attached. Conventionally, this is a manual operation requiring the time-consuming and costly use of hand tools by trained assemblers. As aircraft become more complex, the magnitude of assembly problems increases. Therefore, in recent years, more thought has been given to the use of robots to secure mating structural members by shearclips.

Although robotic devices are capable of grasping and positioning shearclips in precise locations, a problem has existed in temporarily retaining these clips in position before a subsequent robotic tool can be employed to fasten the clips in position permanently. In U.S. Pat. No. 4,770,734, issued Sept. 13, 1988, by the assignee of this application, a vacuum-handling device is disclosed which allows a large number of shearclips to be temporarily positioned in place, one after another, after which fasteners could quickly attach these parts to aircraft structural members. However, in this mentioned copending application, the temporary shearclip fixing means took the form of double-sided adhesive tape that was pressed to each shearclip prior to its being positioned against a structural member. Temporary securement of the clip to a robotic tool is accomplished by utilizing vacuum handling as the bracket is moved by a robotic tool to a final destination point where the adhesive tape temporarily retains the shearclip in position until a subsequent robotic tool can complete fastening.

Although this prior system can operate generally satisfactorily, there is increased need for greater production and efficiency in view of the fact that a great number of these shearclips are employed for a particular aircraft.

BRIEF DESCRIPTION OF THE INVENTION

The present invention is an improvement over the previous system as discussed. The improvement is twofold. In the first place rather than affixing double-sided adhesive tape to each shearclip, the present invention utilizes a different approach whereby individual shearclips are deposited on an adhesive carrier sheet during which time the adhesive material will transfer to the metal surface of the shearclips. This avoids the necessity of individually affixing the double-sided adhesive tape to the shearclips. However, in order to remove the shearclips from the carrier sheet and overcome the adhesive retaining forces, it is necessary to create a clip-handling device for a robotic tool which has the capability of creating strong pulling forces to free the shearclips from a carrier sheet. Accordingly, a second aspect of the present invention is the creation of a mechanical clamping means which strongly grips the shearclip while the robotic tool withdraws the shearclip from the carrier sheet. When this is accomplished, the present invention allows for the release of the mechanical clamping action and reverts to the vacuum-holding action to complete temporary securement of the shearclip against a structural member.

BRIEF DESCRIPTION OF THE FIGURES

The above-mentioned objects and advantages of the present invention will be more clearly understood when considered in conjunction with the accompanying drawings, in which:

FIG. 3 is a perspective schematic representation of shearclips deposited against an adhesive transfer sheet.

DETAILED DESCRIPTION OF THE INVENTION

Figure 1:
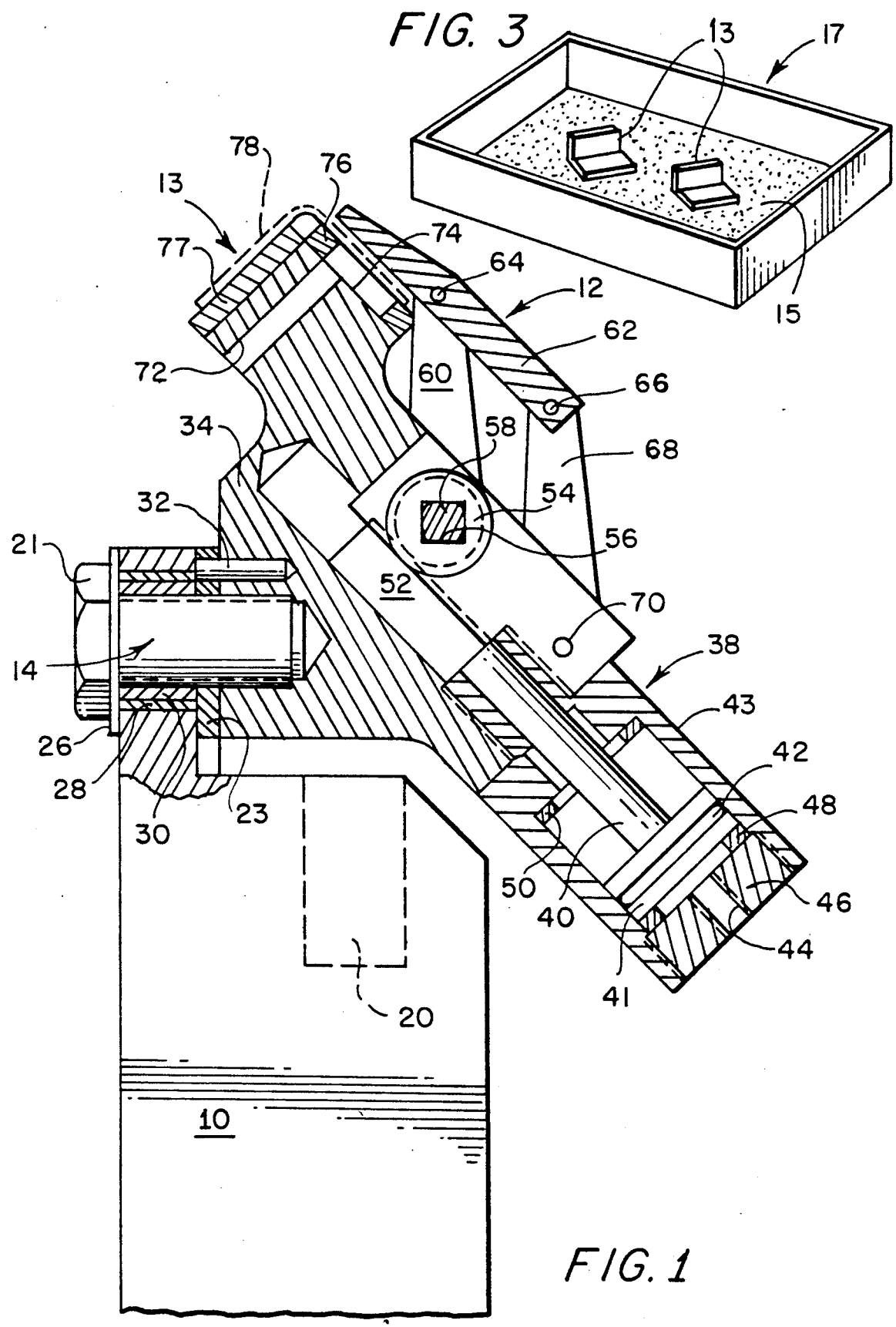
FIG. 1 is a sectional view of the present vacuum-mechanical device.

The functional object of the robotic device forming the present invention is to pull away brackets, such as shearclips from an adhesive carrier sheet which lies on the bottom of a storage tray, such as depicted in FIG. 3. The robotic device is mechanically illustrated in FIGS. 1 and 2. The mechanical-vacuum shearclip-handling device of the present invention is generally indicated by reference numeral 12 and is seen to be mounted on the end of a robotic arm 10, suitable for use with a robot such as the type manufactured by the ASEA company of Sweden.

FIG. 1 illustrates the handling device 12 in an employed condition. A shearclip 13 is shown in dotted lines in an engaged position on the handling device. As in the case of the earlier clip-handling device discussed, the clip is subjected to vacuum holding. However, during an initial movement phase of the handling device, the shearclips 13 must be withdrawn from a storage tray 17 (FIG. 3) which has on its base an adhesive carrier strip 15. By storing shearclips 13 on the carrier strip, the adhesive is transferred to the clip, which expedites the preparation of the clips, as previously explained in connection with the Brief Description of the Invention. Since vacuum holding of the clip would not be sufficient to withstand the retaining forces of the adhesive carrier strip 15, mechanical clamping means are provided on the handling device 12. In the preferred embodiment of the invention, this clamping means takes the form of a pivotally mounted movable jaw 62 shown clearly in FIG. 1. As will be seen from this figure, during an initial handling phase of the device, the jaw clamps down upon the upstanding flange of the clip, while the latter is in the storage tray 17 (FIG. 3) thus permitting withdrawal of the clip from the storage tray 17. After withdrawal the movable jaw 62 may be retracted from contact with the shearclip and vacuum holding may be resorted to, exclusively.

Figure 2:
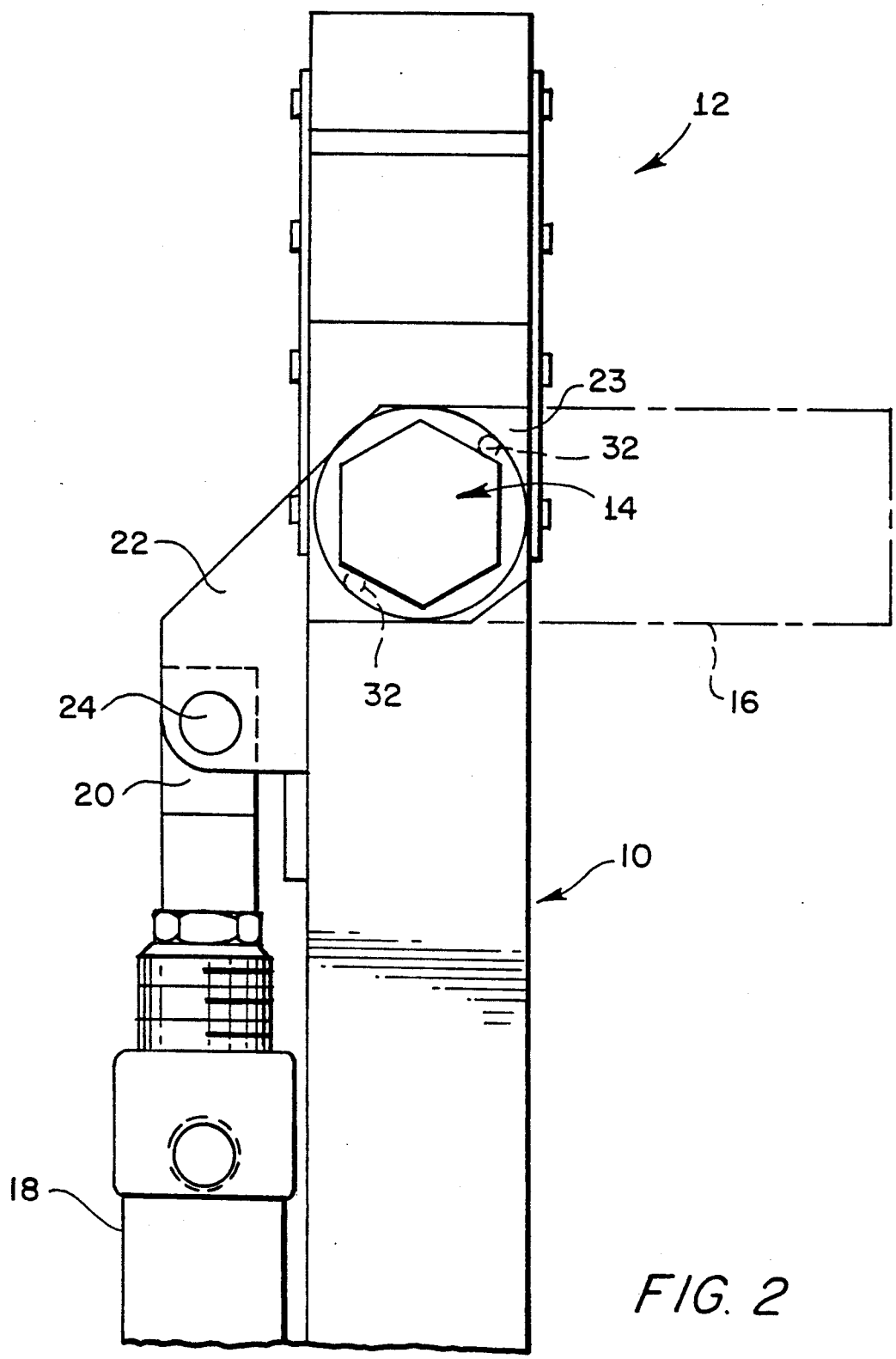
FIG. 2 is a side elevational view of the device.

The shearclip-handling device 12 is pivotally mounted with respect to the robotic arm by means of a pivot 14 shown in the figures. This permits the handling device 12 to undergo orthogonal motion relative to the robotic arm as indicated in dotted lines by reference numeral 16 in FIG. 2. Such orthogonal motion may be useful in positioning the shearclips in various orthogonal positions on a structural member. The handling device 12 is moved from the solid line position to the dotted orthogonal position 16 by means of a cylinder 18 having a plunger 20 connected at its outward end to pivot 24 which completes a pivotal connection with clevis 22. The clevis is attached to rotating plate 23 which is in turn connected, by means of pins 32, to the body 34 (FIG. 1) of the handling device. Thus, when the plunger 20 extends outwardly, the handling device is moved to the dotted orthogonal position 16. FIG. 2 illustrates the pivot 14 as including a hex head bolt 21 which clamps down upon washer 26. A sleeve bearing 28 is concentrically mounted outwardly from a hollow cylindrical spacer 30, both of which are positioned concentrically and radially outwardly from the bolt 21. The pins 32 transmit rotational forces from plate 23 to the body 34 of the handling device 12.

In order to achieve the mechanical grasping of a shearclip, a cylinder is provided which is generally indicated by reference numeral 38. The cylinder includes a rod 40 and piston 41 located within the interior of the cylinder body 43. The piston is provided with an 0-ring seal 42. A pneumatic port 44 is provided in a cover plate 46 of the cylinder. Annular damping plates 48 and 50 are located at both extreme positions of piston travel. The rod 40 is coaxially connected to a rack gear 52 which cooperates with a pinion gear 54. Displacement of the rod 40 and attached rack gear 52 causes rotation of the pinion gear 54. The pinion gear has a square-shaped opening 56 formed therein so it can be keyed to a similarly shaped section of shaft 58. The shaft is connected to a pair of parallel first link members 60, the latter being driven as the shaft 58, to which the links are keyed, undergoes rotation in response to rotational motion of pinion gear 54. Outward ends of links 60 are pivotally connected to movable jaw 62 via pivot pin 64. In order to stabilize movement of the movable jaw 62, a second pair of parallel links 68 is provided between a pivot pin 66 in the lower illustrated end of jaw 62 and a second pin 70 passing through the body of the device 12. Accordingly, link pairs 60, 68 and movable jaw 62 form a linkage mechanism which is positively driven by the square section of shaft 58. As previously mentioned, the jaw 62 is moved to a clamping position against a shearclip 13 when the clip is to be withdrawn from the adhesive carrier sheet 15 located in tray 17. After withdrawal of the shearclip, the cylinder 38 is driven to a second state wherein the movable jaw 62 is moved away from shearclip 13 thereby removing the clamping force. As will be appreciated, after withdrawal of the movable jaw 62 from contact with the shearclip 13, it is necessary to somehow retain the clip against the handling device 12. In order to accomplish this function, a vacuum port 72 is formed through the body 34 of the handling device 12. An elastomeric pad 76 is secured to the outer surface of the body 34 against which the grasped flange of shearclip 13 may rest. The pad 76 has an opening 74 formed centrally therethrough to communicate the vacuum from port 72 thereby securing, by vacuum, the shearclip 13 against pad 76. A second solid pad 77 may be orthogonally positioned with respect to pad 76 and serves as a support for the other flange of shearclip 13.

The vacuum securement of the shearclip 13 exists during the entire handling operation of a shearclip 13. Thus, after the movable jaw 62 is withdrawn from clamping contact with a shearclip 13, only the vacuum securement of the clip retains the clip against pads 76 and 77. The robotic arm 10 is then moved to allow temporary positioning of a retained shearclip 13 against the structural member by virtue of adhesive transferred to the outside surface 78 of the shearclip. After the shearclip 13 is temporarily retained against a structural member, other robotic tools may be employed to complete mechanical fastening.

As will be appreciated from the preceding discussion, the present invention offers a solution for quickly picking up and handling shearclips or other similarly configured brackets by means of a robotic device utilizing a combination of vacuum and mechanical securing means.

It should be understood that the invention is not limited to the exact details of construction shown and described herein for obvious modifications will occur to persons skilled in the art.

I claim:

1. A bracket-handling device for mounting on a robotic arm for handling angle brackets which have separate legs disposed at right angles relative to each other, the device comprising:
   a body;
   a solid pad mounted to the body and having surfaces disposed at right angles relative to each other which contact the respective legs of said angle bracket;
   vacuum passage means formed in the body and passing through the pad for exerting vacuum pressure on a first surface of one leg of the bracket to maintain contact between the pad and the bracket;
   a single unilateral jaw movably mounted in opposed relationship to the body for contacting a second surface of said one leg which is opposite said first surface and clamping the bracket against the pad during a portion of a bracket-handling interval;
   linkage means pivotally connected to the jaw;
   gear means for moving the linkage means; and actuator means for powering movement of the gear means.

2. The structure set forth in claim 1 wherein the gear means comprises:
   a rack gear connected to the actuator means;
   a pinion gear keyed to a shaft which is positioned transversely of the rack gear, the pinion and rack gears meshing for translating motion from the rack gear to the shaft via the pinion gear; and
   the linkage means being keyed to the shaft for linked movement therewith.

3. The structure set forth in claim 2 wherein the linkage means comprises:
   a first pair of parallel links keyed at first ends thereof to the shaft, opposite ends of the links being pivotally connected to the jaw whereby the jaw is driven by shaft rotation;
   a second pair of parallel links pivotally connected at first ends thereof to the body while opposite ends are pivotally connected to the jaw whereby the second pair of parallel links supportively follows jaw movement.

4. The structure set forth in claim 3 together with means for pivotally mounting the body to a robotic arm; and second actuator means connected between the body and the robotic arm for changing the spatial orientation of the brackets.

5. A bracket-handling device for mounting on a robotic arm for handling angle brackets which have separate legs disposed at right angles relative to each other, the device comprising:
   a body;
   a solid pad mounted to the body and having surfaces disposed at right angles relative to each other which contact the respective legs of said angle bracket;

vacuum passage means formed in the body and passing through the pad for exerting vacuum pressure on a first surface of one leg of the bracket to maintain contact between the pad and the bracket;

a single unilateral jaw movably mounted in opposed relationship to the body for contacting a second surface of said one leg which is opposite said first surface and clamping the bracket against the pad during a portion of a bracket-handling interval;

a rack gear movable in response to an actuator means;

a pinion gear keyed to a shaft which is positioned transversely of the rack gear, the pinion and rack gears meshing for translating motion from the rack gear to the shaft via the pinion gear;

a first pair of parallel links keyed at first ends thereof to the shaft, opposite ends of the links being pivotally connected to the jaw whereby the second pair of parallel links supportively follows jaw movement.

6. The structure set forth in claim 5 together with means for pivotally mounting the body to a robotic arm; and second actuator means connected between the body and the robotic arm for changing the spatial orientation of the clamped brackets.

* * * * *

UNITED STATES PATENT AND TRADEMARK OFFICE
CERTIFICATE OF CORRECTION

PATENT NO. : 5,018,937

DATED : May 28, 1991

INVENTOR(S) : Hans M. Kolstee

It is certified that error appears in the above-identified patent and that said Letters Patent is hereby corrected as shown below:

Column 6, line 5, after "whereby" insert

--the jaw is driven by shaft rotation; and a second pair of parallel links pivotally connected at first ends thereof to the body while opposite ends are pivotally connected to the jaw whereby--.

Signed and Sealed this

Twenty-ninth Day of September, 1992

Attest:

DOUGLAS B. COMER

*Attesting Officer*    *Acting Commissioner of Patents and Trademarks*